March 12, 1968  P. A. MANOR ETAL  3,372,901
VALVES
Filed April 13, 1964  2 Sheets-Sheet 1

INVENTOR
PAUL A. MANOR
GUSTAV KANIA
WILLIAM A. GENERKE
BY Stauck, Nolan & Neale
ATTORNEYS

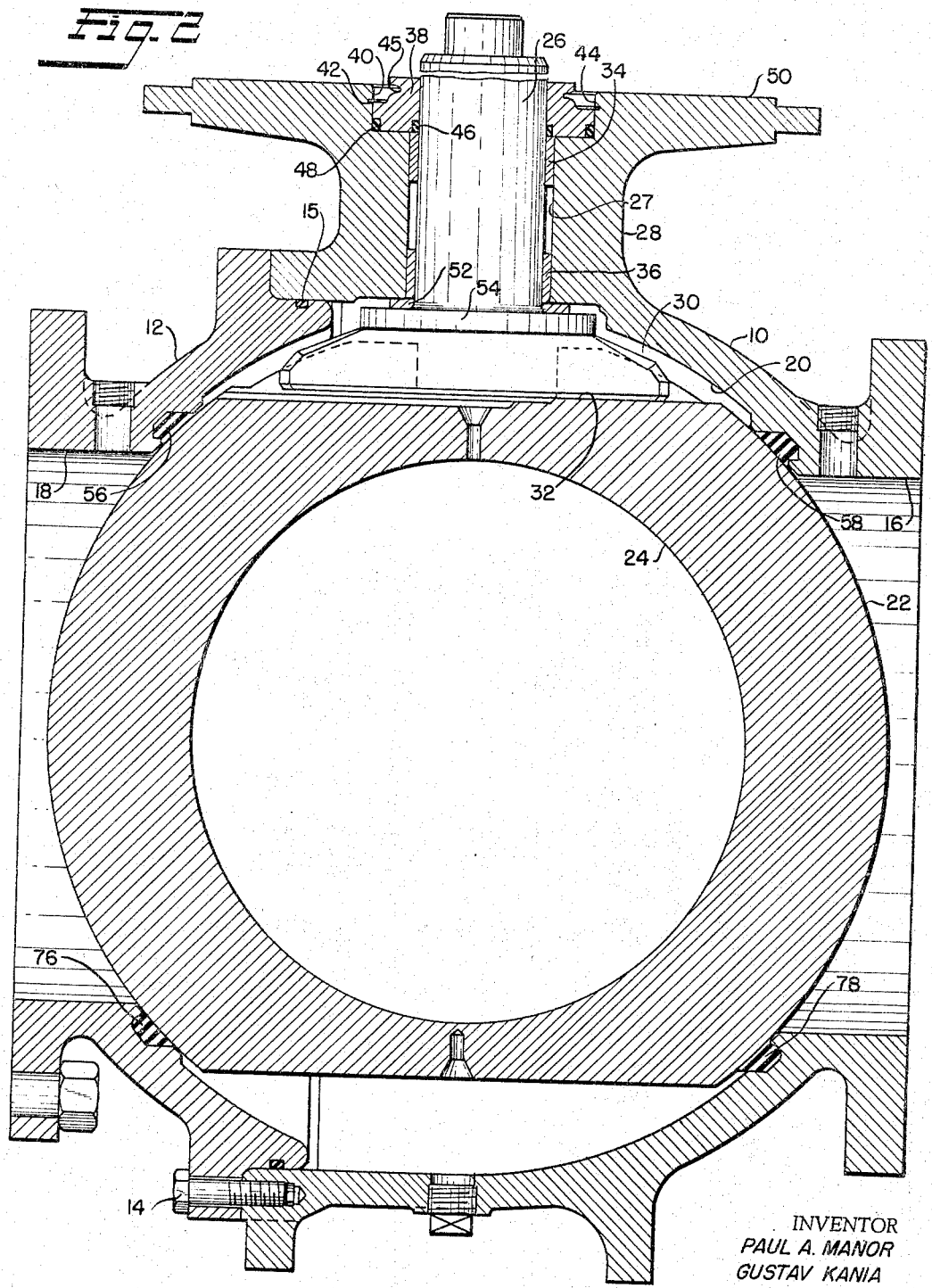

United States Patent Office 3,372,901
Patented Mar. 12, 1968

3,372,901
VALVES
Paul A. Manor and Gustav Kania, Pittsburgh, Pa., and William A. Generke, Wadsworth, Ohio, assignors to Rockwell Manufacturing Company, Pittsburgh, Pa., a corporation of Pennsylvania
Filed Apr. 13, 1964, Ser. No. 359,098
4 Claims. (Cl. 251—315)

This invention relates to valves and more particularly to valve sealing constructions and to methods for their manufacture and installation.

The invention will be described herein as applied to ball valves but it will be understood that in certain aspects it is equally applicable to other types of valves such as plug valves.

The invention has been found to have particular utility in the field of high pressure valves of considerable size, i.e., those used to control the flow of fluids in pipe lines up to 48 inches in diameter, the fluid being under a pressure of 1000 p.s.i. or higher.

In addition to the obvious requirement that such valves provide a drop tight seal under varying conditions of pressure and flow, it is also necessary that the sealing construction be able to withstand repeated opening and closing actions of the valves without damage to the seals or to the valve closure member, that the valve closure member be movable between its limit positions without excessive torque and that the sealing surfaces be able to withstand the effects of corrosive fluids.

It is the principal purpose and object of the present invention to provide improved valve sealing structures which satisfy these requirements to a degree not heretofore attained.

In achieving this primary objective the present invention provides sealing mechanisms comprising a pair of plastic sealing rings of unique configuration installed in and carried by the valve body structure in a novel manner.

It is a further object of the present invention to provide novel plastic seat rings which are sufficiently deformable to assure the formation of drop tight seal under either high or low pressure and yet are sufficiently rigid and are provided with sufficient support to assure the retention of their original sealing configuration.

In accordance with another aspect of the invention, the plastic seat rings are first formed generally to their final configuration, they are then installed with a light press fit in preformed grooves prepared in the valve body structure while the temperature of the seat rings is maintained from 50° F. to 90° F. below the temperature of the valve body structure. The seat rings then expand to form a fit with the supporting groove which is sufficiently tight to prevent dislodgement of the rings under all service conditions. The seating surfaces of the rings are then machined in situ to final dimensions to provide a construction which may be fabricated to close tolerances and which has sufficient stability to retain its dimensions in service.

It is, accordingly, a further important object of the present invention to provide novel methods for manufacturing and installing plastic seat rings in valve body structure, the methods being relatively inexpensive and producing a valve of superior performance characteristics.

Additional objects and advantages of the present invention will become apparent as the description proceeds in connection with the accompanying drawings in which:

FIGURE 2 is a central vertical section of the valve of FIGURE 1;

Figure 1:
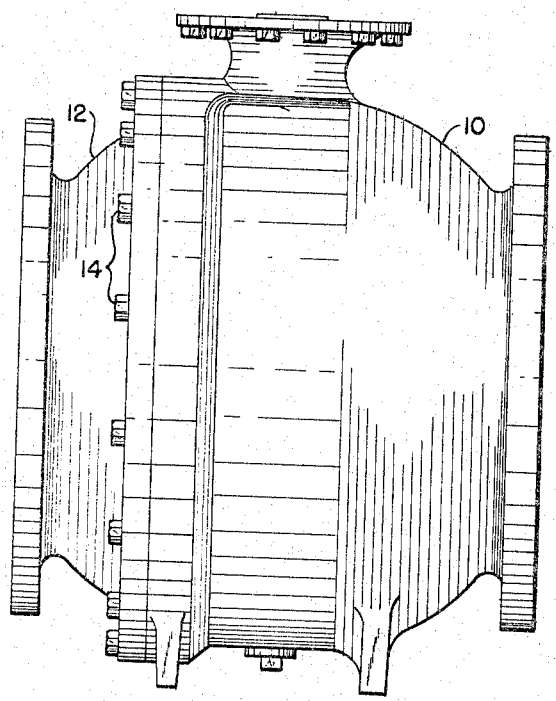
FIGURE 1 is a side elevation of a ball valve incorporating the sealing structure of the present invention.

Referring now more particularly to the drawings, the overall valve body structure is of essentially conventional construction except as noted below and comprises a main body member 10 to which an end closure plate 12 is secured by bolts 14 the parts being sealed by an O-ring 15. The valve body 10 and the closure plate 12 are provided with aligned ports 16 and 18, the outer ends of which are flanged to permit attachment of the valve to the associated pipe lines in accordance with conventional practice. At their inner ends the ports 16 and 18 intersect an enlarged central generally spherical valve chamber 20 in which a valve closure ball 22 is received. The ball 22 has a central through port 24 which occupies the position shown in FIGURE 2 when the valve is closed and which is aligned with the ports 16 and 18 when the closure member 22 is rotated 90° to its open position.

The ball 22 is moved through an arc of 90° between its open and closed positions by a stem 26 rotatably mounted in a through bore 27 in a boss 28 formed integrally with the valve body member 10. The lower end of the stem 26 is provided with a tang 30 loosely received in a slot 32 formed in the upper part of the ball 22 and extending transversely of the axis of the opening 24. Because of the disposition of the slot 32 and the lateral clearance between the tang 30 and the slot, the ball 22 is essentially free floating in any position to which it is rotated. Thus, when the valve is closed the ball is free to shift axially of the ports 16 and 18 under the influence of line pressure.

The stem 26 is supported for rotation by upper and lower bushings 34 and 36 preferably of polypropylene and a gland 38 held in place by a snap ring 42 in a counterbore 44 at the upper end of the boss 28. The gland 38 is peripherally grooved at 45 to facilitate its removal. A stem seal is provided by inner and outer O-rings 46 and 48, respectively, carried by the gland 38, the former sealing against the stem 26 and the latter sealing against the counterbore 44. At its upper end the stem 26 is suitably formed for drive connection either to a manual operator or power operator (not shown) supported on the flange 50 of boss 28. The stem assemlby is completed by a polypropylene or like plastic thrust washer 52 interposed between the valve body structure and an enlarged collar 54 formed integrally with the stem 26.

Figure 3:
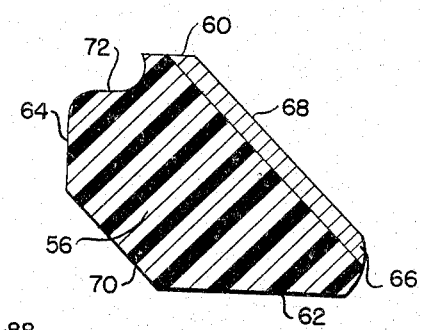
FIGURE 3 is an enlarged section of one of the two identical seat rings as it appears before installation in the valve body.
Figure 4:
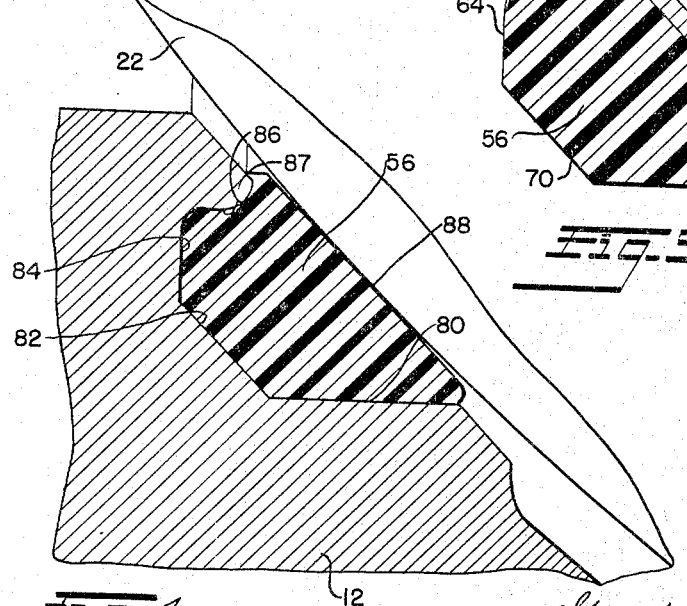
FIGURE 4 is an enlarged view of a portion of the structure shown in FIGURE 3 illustrating the seat ring after installation and showing the adjacent portion of the valve closure member.

The valve is sealed by engagement of the surface of the ball 22 with one of a pair of identical seat rings 56 and 58 which form an important part of the invention and will now be described in detail with particular reference to FIGURES 3 and 4.

The seat rings are fabricated from petrochemical plastic, preferably polypropylene, although other plastics such as nylon, may be suitable for certain applications. Polypropylene is preferred because of its machineability and formability, because it provides a low co-efficient of friction and because it possesses the necessary degree of elastic deformability to permit the formation of the seal by means of pressure alone. Conveniently, the seat rings may be initially molded to a square cross-section and then machined to the preliminary form shown in FIGURE 3. To assure attainment of the desired dimensions, the machining operation is performed at a predetermined temperature, for example 68° F.

In this form, the seal ring has inner and outer cylindrical surfaces 60 and 62 and opposed radial surfaces 64 and 66. The corresponding ends of the surfaces 60 and 66 are connected by a surface 68 forming a portion of a cone having a half angle of approximately 45°. An opposed similarly inclined surface 70 connects the corresponding edges of the surfaces 62 and 64. The inner edge of the surface 64 is connected to the edge of the surface 60 by a reversely curved section 72 providing an open annular curved surface recess around the inner periphery of the seat ring.

To receive the respective rings 56 and 58, grooves 76 and 78 are machined in the closure member 12 and the main body 10, respectively, surrounding the body ports. The grooves have surfaces 80, 82, 84 and 86 corresponding, respectively, to the ring surfaces 62, 70, 64 and 72. The surface 86 effectively forms a lip 87 which materially aids in supporting the ring and retaining it in the recess even under conditions of high flow or high differential pressure. The curved surface of the lip avoids stress concentration and cutting which might otherwise be produced by a sharp shoulder at this point. Again, to assure the desired dimensional relationship of the parts, the grooves are machined when the parts are at a predetermined temperature, for example, 68° F. The seat ring and the grooves are so formed that when they are at the same temperature the dimensions of the rings are slightly larger than the corresponding dimensions of the grooves.

Preferably, at least the surface 80 of each seat receiving groove is serrated to aid in the retention of the seat ring when it is installed in the groove.

The seat rings are installed in the groove in the following manner. The valve body parts 10 and 12 are maintained at approximately room temperature while the seat rings are chilled to a temperature which is an inverse function of the size of the seat ring. For example, seat rings suitable for installation in an eight inch valve may be chilled to a temperature of from −10° F. to −20° F. whereas a seat ring suitable for use in a 48 inch valve will be chilled to a temperature which may vary from 10° F. to 20° F. When the seat rings have been properly chilled they contract sufficiently to permit their insertion with a light press fit into the body grooves. In some instances it is desirable to hold the rings in place with weights or clamps until the expansion of the rings has progressed sufficiently to hold the rings firmly in proper position. In approximately 30 to 60 minutes the seat rings will be fully expanded and are then ready for finish machining. The rings are finished by removing the portion of the seat ring shown shaded in FIGURE 3 to form a final seating surface 88 which is conical and has a half angle of 45°. Thus each element of the seating surface 88 is tangent to the adjacent surface of the ball 22.

The parts are so dimensioned that in the absence of fluid pressure the spherical surfaces of the ball are in light pressure engagement with the conical seating surfaces 88 of the rings 56 and 58. Initially the contact between the ball and the seat rings is essentially line contact at least in relatively small valves.

In larger valves, the weight of the ball which may be several thousand pounds, may cause sufficient deformation of the lower portion of the seat ring to establish surface contact of substantial width in this area.

Since the valve is bi-directional either the port 16 or the port 18 may be considered to be the inlet port. Assuming that the port 18 is connected to a source of high pressure and the valve is moved to the closed position of FIGURE 2, ball 22 will shift to the right slightly under the influence of line pressure to deform the seat ring 58 and establish surface contact between the ball and the seat ring, the width of the surface contact being a function of the pressure differential across the ball 22. Accordingly, the initial seal formed in the absence of line pressure is augmented by the development of line pressure differential.

It has been found that the seat rings of the present invention display no tendency to be forced or blown out of the grooves in which they are received nor to be extruded into the clearance spaces between the valve body structure and the ball. It has also been determined that the valve may be opened easily even after long periods since the seat rings do not stick to the surfaces of the ball. To further reduce the operating torque and to increase the corrosion resistance of the valve, the ball is preferably provided with a nickel coating commercially known as a Kanigen coating.

Since the seat rings are so much softer than the ball, any wear between the parts will be confined to the seat rings which may thus be regarded as sacrificial parts. When the wear has progressed to the point where the valve is unserviceable, the seat rings may be readily replaced thus quickly and easily restoring the valve to its initial condition.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve comprising a metal body having flow passages intersecting an enlarged central chamber, a ported ball valve member in said chamber mounted for rotation between open and closed positions, and sealing structure for said valve comprising a pair of integrally formed solid elastically deformable seat rings fixedly mounted with a shrink fit in grooves in said valve body structure, said rings extending around said body adjacent the inner ends of said flow passages to effectively surround said flow passages, said rings each having an essentially conical seating surface engaging the ball member and joined at its radially outer edge to an essentially cylindrical surface extending into a corresponding cylindrical surface in said groove, and interlocking means at the inner peripheries of said rings to hold said rings against accidental dislodgement from said grooves comprising an annular curved surface open recess extending around the inner periphery of each ring adjacent said seating surface and a correspondingly shaped annular curved surface lip on the adjacent groove wall projecting into said recess.

2. A valve comprising a metal body having flow passages intersecting a large central chamber, a ported ball valve member in said chamber mounted for rotation between opened and closed positions, and sealing structure for said valve comprising a pair of seat rings integrally formed of non-metallic elastically deformable plastic tightly received with a tight fit in grooves in said valve body structure, said rings extending around said body adjacent the inner ends of said flow passages to effectively surround said flow passages, said rings projecting outwardly from their respective grooves, the projecting portions of said rings being formed to provide essentially conical seating surfaces engageable by said ball, and interlocking means on said grooves and rings for holding said rings against accidental dislodgement from said grooves comprising an annular curved surface open recess extending around the inner periphery of each ring adjacent said seating surface and a correspondingly shaped annular curved surface lip on the adjacent groove wall projecting into said recess.

3. A valve assembly comprising a metal body having an internal chamber intersected by opposed fluid flow passages, means forming similar annular grooves in the chamber wall surrounding the inner ends of said passages, annular seat rings each integrally formed of a non-metallic solid elastically deformable plastic secured tightly within said grooves and providing annular seating surfaces facing into said chamber, a ported ball rotatably mounted within said chamber for movement between positions where it connects and blocks said passages, said ball having spherical surfaces engaging said seat ring surfaces, each of said seat rings being mounted within its groove with a shrink fit and having a curved surface annular recess opening around its inner periphery and the metal body being formed adjacent one edge of each said groove with an integral retainer curved surface lip extending into the recess of the adjacent seat ring near the ball seating surface thereof.

4. The valve assembly defined in claim 3 wherein said seat rings are made of polypropylene.

References Cited

UNITED STATES PATENTS

| | | | |
|---|---|---|---|
| 3,041,036 | 6/1962 | McFarland | 251—317 X |
| 3,131,906 | 5/1964 | King | 251—317 X |
| 3,239,191 | 3/1966 | Widera | 251—315 X |
| 2,889,733 | 6/1959 | Vanderhoof | 29—447 X |
| 3,000,089 | 9/1961 | Baker et al. | 29—447 X |

M. CARY NELSON, *Primary Examiner.*

M. O. STURM, E. K. FEIN, *Assistant Examiners.*